(12) United States Patent
Langlais et al.

(10) Patent No.: US 7,816,627 B2
(45) Date of Patent: Oct. 19, 2010

(54) ATTACHMENT SYSTEM FOR ATTACHING AN ELECTRIC CABLE TO A GLASS PANE TO PROVIDE ELECTRICITY THERETO

(75) Inventors: Richard Langlais, Cacouna (CA); Stephane Fournier, Riviere-du-Loup (CA); Stephane Mercier, Riviere-du-Loup (CA)

(73) Assignee: Prelco Inc., Riviere-du-Loup, Quebec (CA)

(*) Notice: Subject to any disclaimer, the term of this patent is extended or adjusted under 35 U.S.C. 154(b) by 763 days.

(21) Appl. No.: 11/698,620

(22) Filed: Jan. 25, 2007

(65) Prior Publication Data

US 2007/0193138 A1 Aug. 23, 2007

(30) Foreign Application Priority Data

Jan. 25, 2006 (CA) .................................... 2533859

(51) Int. Cl.
*H05B 1/00* (2006.01)
(52) U.S. Cl. ........................ 219/209; 219/203
(58) Field of Classification Search ................ 219/209, 219/203, 201; 439/876, 874, 862
See application file for complete search history.

(56) References Cited

U.S. PATENT DOCUMENTS

| 287,000 | A | * | 10/1883 | Clinch .................... 280/74 |
| 2,431,673 | A | * | 12/1947 | Auger ...................... 219/532 |
| 2,787,690 | A | | 4/1957 | Razlag |
| RE25,591 | E | | 6/1964 | Swengel |
| 3,399,234 | A | | 8/1968 | Thieben |
| 3,467,818 | A | | 9/1969 | Ballentine |
| 3,549,785 | A | | 12/1970 | Timko |
| 3,743,748 | A | | 7/1973 | Reeder |
| 3,760,157 | A | | 9/1973 | Newman et al. |
| 3,918,783 | A | * | 11/1975 | DuRocher et al. ............. 439/55 |
| 3,981,556 | A | | 9/1976 | Sabatelli et al. |
| 4,415,196 | A | | 11/1983 | Baum et al. |
| 4,425,021 | A | | 1/1984 | Nicolino |
| 4,593,175 | A | | 6/1986 | Bowser et al. |
| 4,997,396 | A | * | 3/1991 | Gold et al. ................... 439/801 |
| 5,023,403 | A | | 6/1991 | Eckardt et al. |
| 5,213,828 | A | * | 5/1993 | Winter et al. ................ 428/46 |
| 5,268,700 | A | | 12/1993 | Hirotsu et al. |
| 5,357,074 | A | | 10/1994 | Pawlikowski |
| 5,852,284 | A | * | 12/1998 | Teder et al. ................ 219/522 |
| 5,879,206 | A | | 3/1999 | Badgley et al. |
| 6,406,337 | B1 | | 6/2002 | Machado |
| 6,544,043 | B1 | * | 4/2003 | Smith ......................... 439/34 |
| 6,551,150 | B2 | * | 4/2003 | Machado .................... 439/876 |
| 6,643,898 | B1 | * | 11/2003 | Cameron et al. ............. 16/382 |

(Continued)

*Primary Examiner*—Tu B Hoang
*Assistant Examiner*—Vinod D Patel
(74) *Attorney, Agent, or Firm*—Merchant & Gould P.C.

(57) ABSTRACT

An attachment system for attaching an electric cable to a window pane. The system includes a generally elongated plate having a width approximately equal to a thickness of said pane, the plate being provided with a plurality of holes. A socket is fastened to the plate and is shaped and sized to receive a portion of the electric cable within it, the socket being in communication with an opening provided in the plate in order to permit electrical conductors to pass through the plate. The electric cable is fastened to the plate and the plate is fastened to an edge of the pane, in order to resist a 35 lb traction.

10 Claims, 7 Drawing Sheets

U.S. PATENT DOCUMENTS

| | | |
|---|---|---|
| 6,666,700 B2 * | 12/2003 | Kiermaier .................. 439/242 |
| 6,774,342 B2 * | 8/2004 | Capriotti et al. ............. 219/203 |
| 6,926,552 B2 | 8/2005 | Mueller et al. |
| 7,160,130 B2 * | 1/2007 | Ma ............................ 439/331 |
| 2002/0111081 A1 | 8/2002 | Machado |
| 2004/0067684 A1 | 4/2004 | Mueller et al. |
| 2006/0099833 A1 | 5/2006 | Mann |

* cited by examiner

35 LBS

ATTACHMENT SYSTEM FOR ATTACHING AN ELECTRIC CABLE TO A GLASS PANE TO PROVIDE ELECTRICITY THERETO

FIELD OF THE INVENTION

The present invention relates to an attachment system for attaching an electric cable to a glass pane to provide electricity thereto.

DESCRIPTION OF THE PRIOR ART

It is sometimes necessary to provide electrical power to glass panes. Such panes include heated double panes, laminated heated panes, laminated panes with liquid crystals, laminated panes with suspended particles, or any other type of pane requiring power for any reason.

When installing such panes, it is necessary to conceal the electrical conductors within the walls, and to connect them to an electric junction box. Various electrical codes then require that the conductors be mechanically protected against damage, particularly when the voltage is above 24 V. Furthermore, as specified in norm UL962 "Household and commercial furnishing" at section 82.3, certification bodies require that the electrical connections be able to resist a 35 lb traction and still remain attached to the pane.

The present invention thus permits a protective sheath to be attached to a pane and yet resist to a 35 lb traction force as required by norm UL962.

SUMMARY OF THE INVENTION

It is an object of the present invention to provide a fastening system enabling attachment of a protective sheath for electrical conductors to different types of glass panes available on the market.

In accordance with the invention, there is provided an attachment system for attaching an electric cable to a window pane. The system includes a generally elongated plate having a width approximately equal to a thickness of said pane, the plate being provided with a plurality of holes. A socket is fastened to the plate and is shaped and sized to receive a portion of the electric cable within it, the socket being in communication with an opening provided in the plate in order to permit electrical conductors to pass through the plate. Means are provided for fastening the electric cable to the plate and means are provided for fastening the plate to an edge of the pane, in order to resist a 35 lb traction.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 4A:
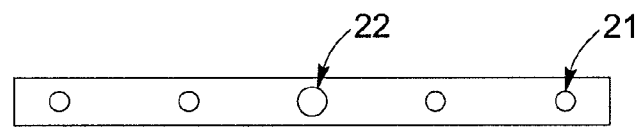
FIGS. 4a, 4b and 4c show a detailed illustration of the connection of the protective sheath, and more specifically a bottom view of the plate (4a), a perspective view of the protective sheath about to be threaded onto the socket (4b) and the protective sheath being secured to the plate and socket (4c)
Figure 4B:
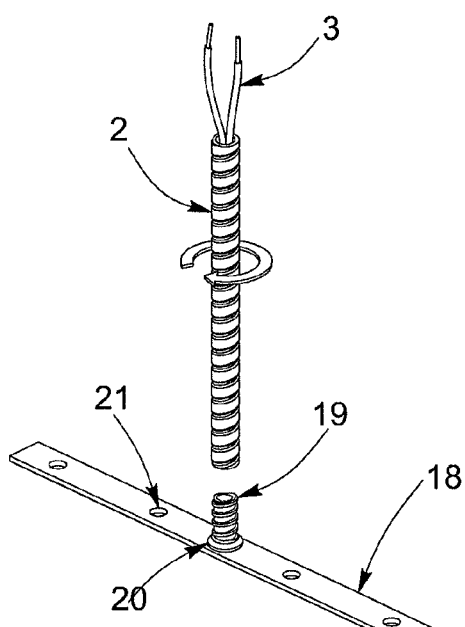
Figure 4C:
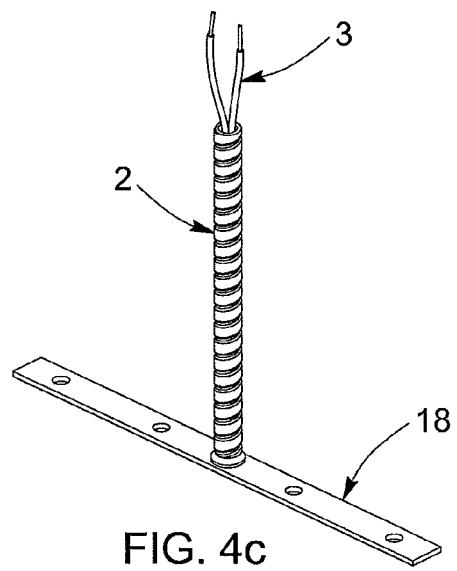

Referring now to the Figures, and particularly FIG. 4, there is shown a plate 18, provided with holes, for facilitating the injection of silicone, polysulfur, butyle or any other sealant. The plate is preferably made of metal, and more preferably of steel.

FIG. 4 also shows a threaded socket 19, adapted to receive the internal threading of a protective sheath 2 for an electric cable 3.

The socket 19 is fastened to the plate 18, preferably by way of soldering. As mentioned, previously, the protective sheath 2 is threaded onto the socket 19 in order to secure the sheath 2 to the socket 19, and thus to the plate 18. It will be readily recognized by a person skilled in the art that the region where the socket 19 is fastened to the plate 18 must be provided with a hole 22 in order to permit passage of the conductors of the electric cable to pass therethrough.

Further preferably, the sharp edges of the inside of the socket are bevelled at a 45° angle in order to protect the cable 3.

It will also be apparent to a person skilled in the art that although the system of the present invention is realized with two separate pieces that are joined together, molding or any other type of method of manufacture, monolithic or not, will meet the objects of the present invention. Furthermore, the threads of the socket enabling the mechanical connection of the protective sheath to the socket could be replaced by any other fastening means, such as pressure screws, glues, etc., well know in the art.

Figure 1:
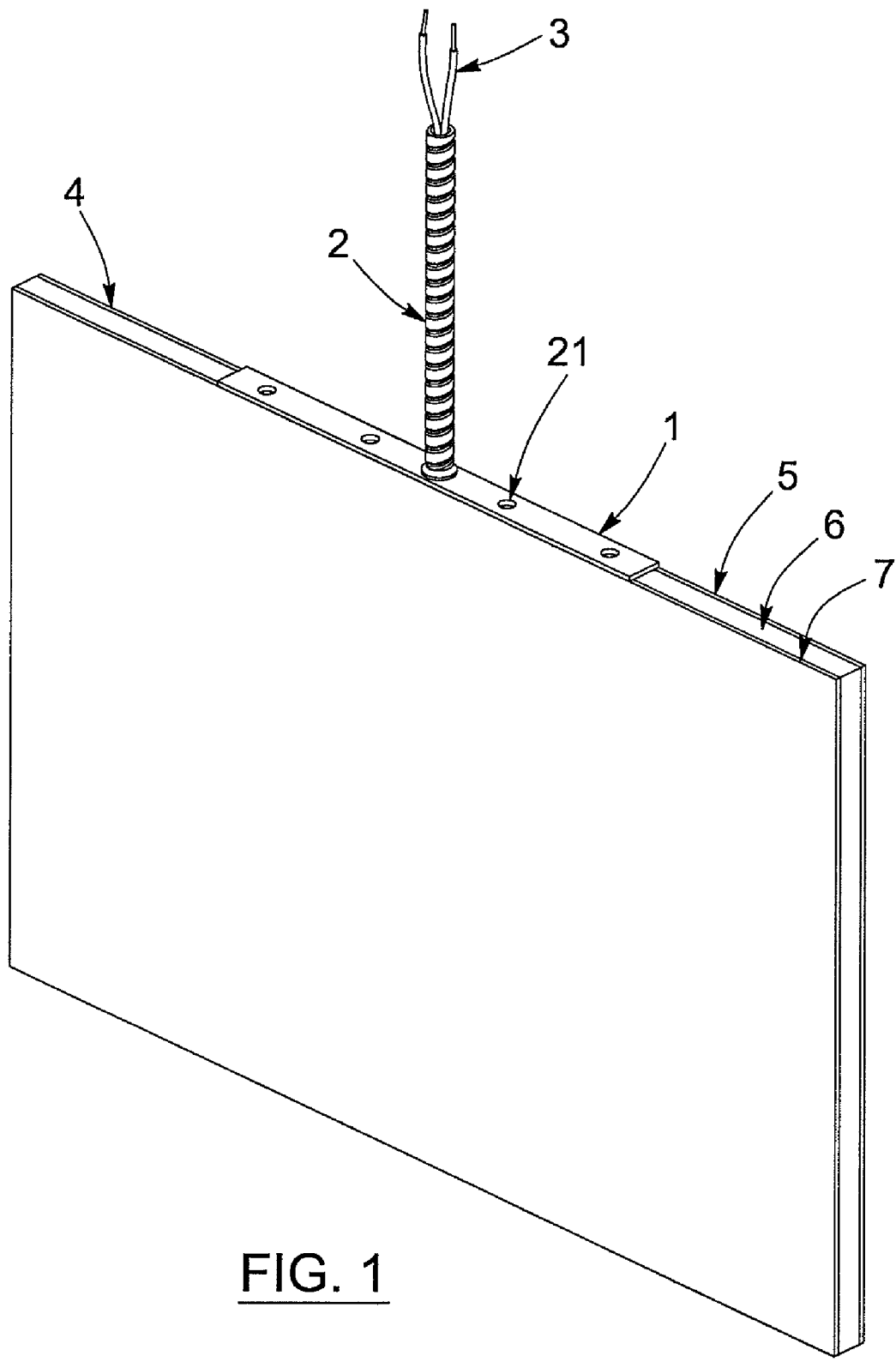
FIG. 1 shows a heated double pane connected to an electrical cable whose protective sheath is connected to the pane according to a preferred embodiment of the invention.

Referring now to FIG. 1, the fastening of the fastening system to a pane 4 according to a preferred embodiment of the present invention is realized by injecting a sealant, such as silicon, into the holes 21 provided on the plate 18. A person skilled in the art will also recognize that the sealant may be applied to the plate 18 prior to joining the plate 18 to the pane 4. A person skilled in the art will also recognize that any other sealant or adhesive which will permit meeting the 35 lbs test can be used instead of silicon.

Figure 2:
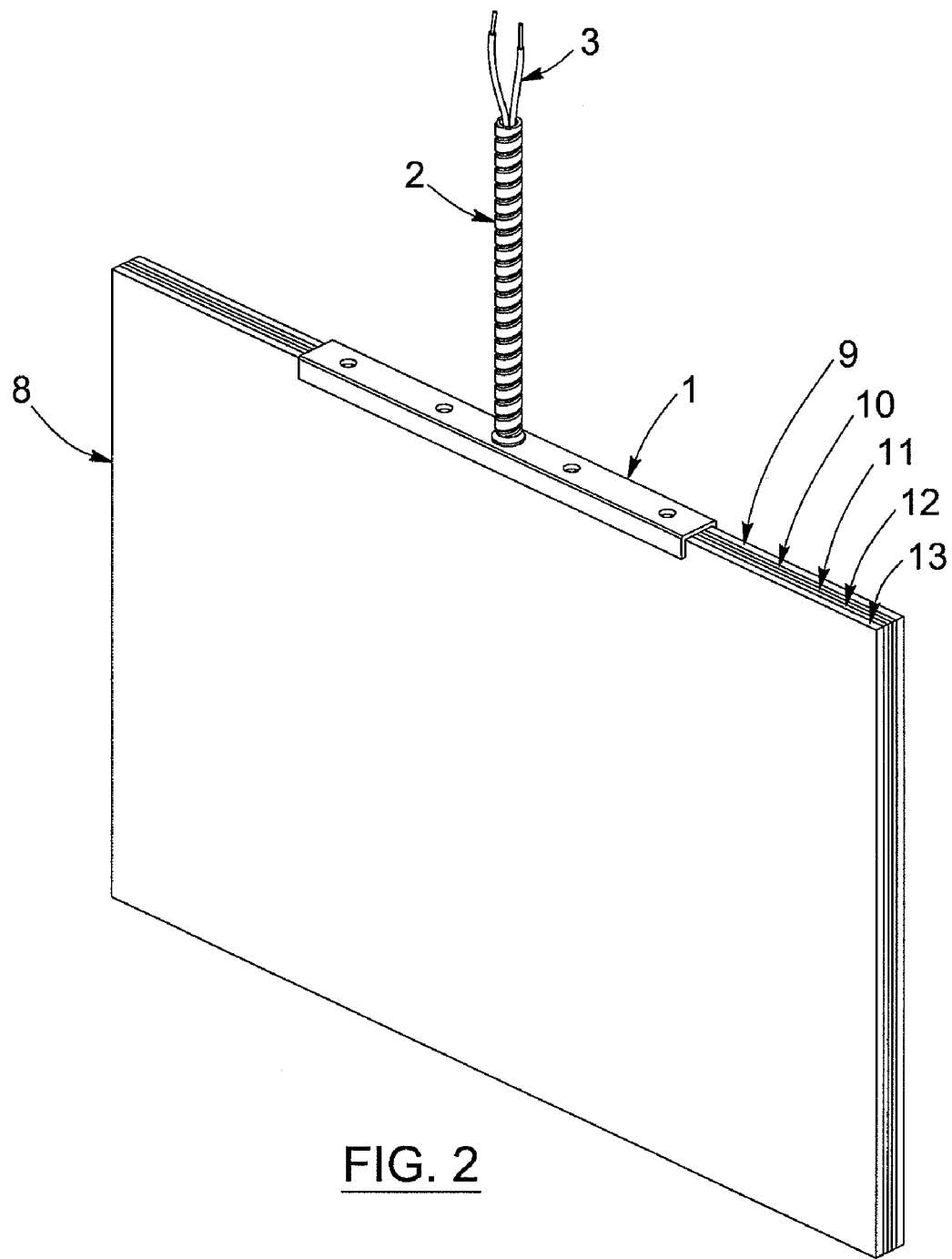
FIG. 2 shows a laminated pane with a liquid crystal film, or with a film of particles in suspension connected to an electrical cable whose protective sheath is connected to the pane according to a preferred embodiment of the invention.

Referring now to FIG. 2, there is shown a variation of the system according to the present invention. In this case, the pane is provided with liquid crystals. The adhesion of the system 1 to the edges of the pane 8 must be realized with an adhesive that is compatible with liquid crystals. Further in this case, it will be appreciated that the plate 18 is U-shaped, in order to receive the pane 18 within the opening defined by the U-shape.

The pane 8 as shown in FIG. 2 consists of an external glass pane 9, an adhesive film 10, a liquid crystal film 11, another adhesive film 12 and finally an internal glass pane 13. The liquid crystal panes are also referred to as "LCD". It will be appreciated that the central film could also be a film with particles in suspension, sold under the trade name SPD, or any other film requiring power.

Figure 3:
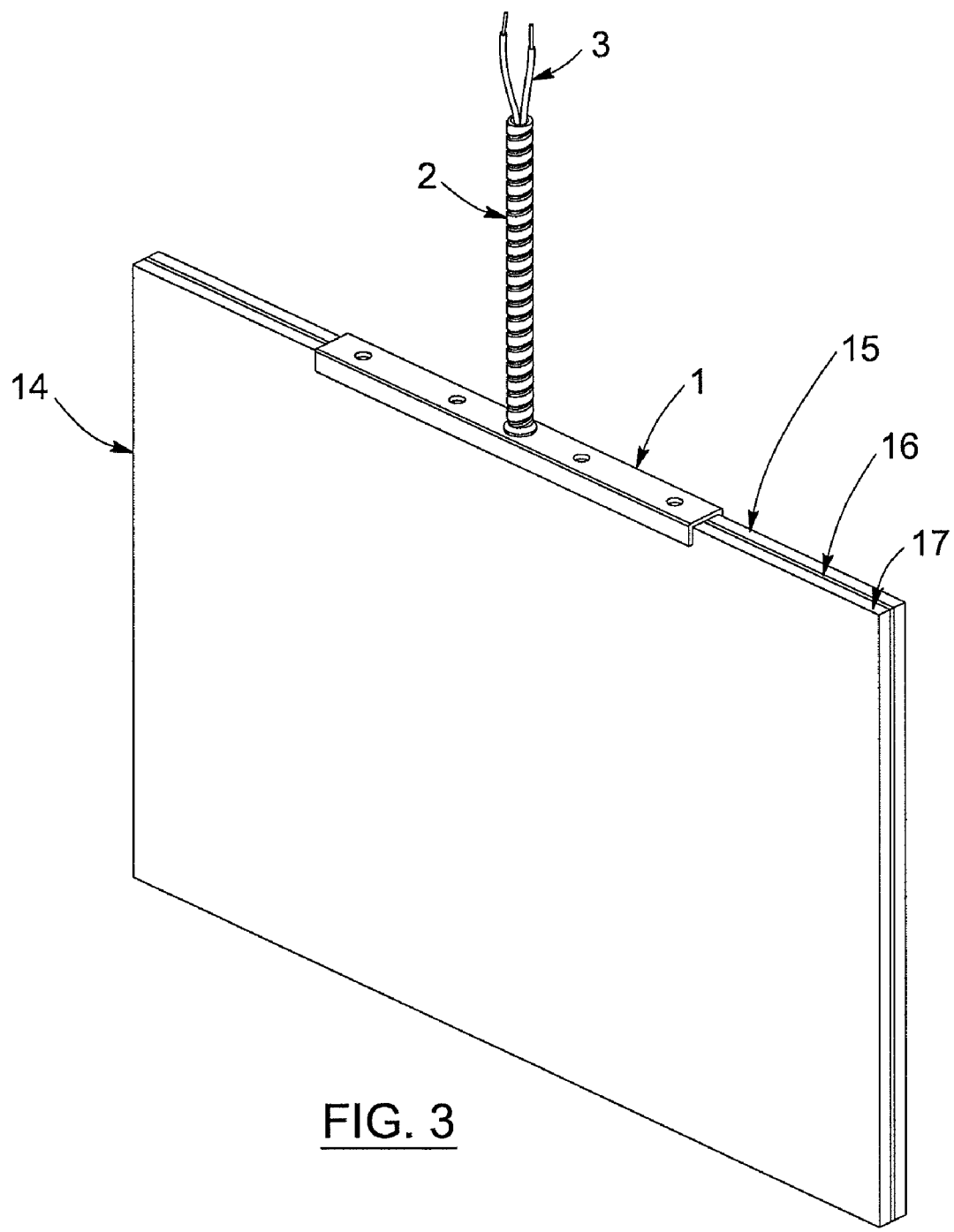
FIG. 3 shows a laminated pane connected to an electrical cable whose protective sheath is connected to the pane according to a preferred embodiment of the invention.

FIG. 3 shows the attachment system 1 according to the present invention used to secure a protective sheath 2 to a heated laminated pane 14. As in the previous cases, the attachment system 1 is secured to the pane through a glue or a sealant. A heated laminated pane 14 as shown in FIG. 3 consists of an external glass pane 15, a laminated film 16 and an external glass pane 17.

Figure 5:
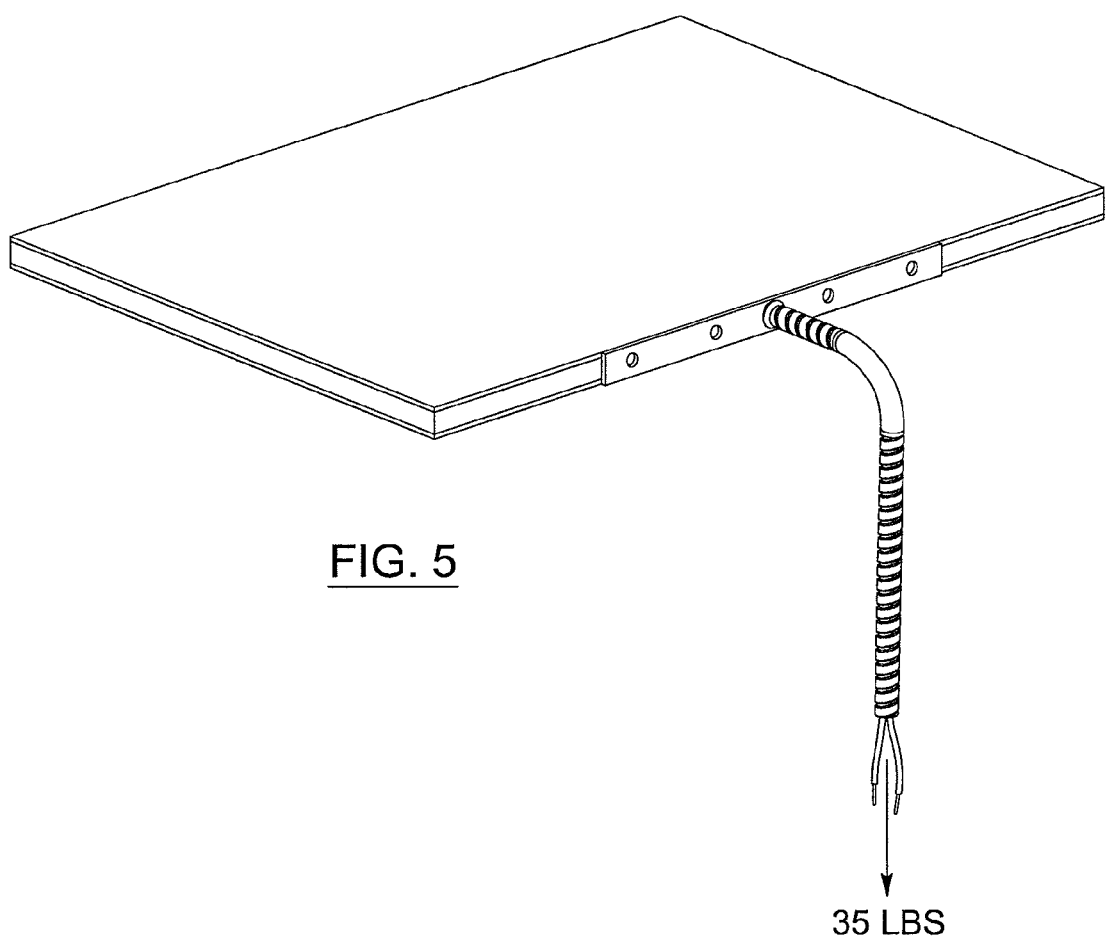
FIG. 5 shows a pane with an attachment system according to a preferred embodiment of the present invention submitted to a 35 lb traction test.

FIG. 5 illustrates the UL962 traction test. As can be appreciated, a 35 lbs force is applied on the protective sheath, and the attachment system must resist such a force.

Figure 6:
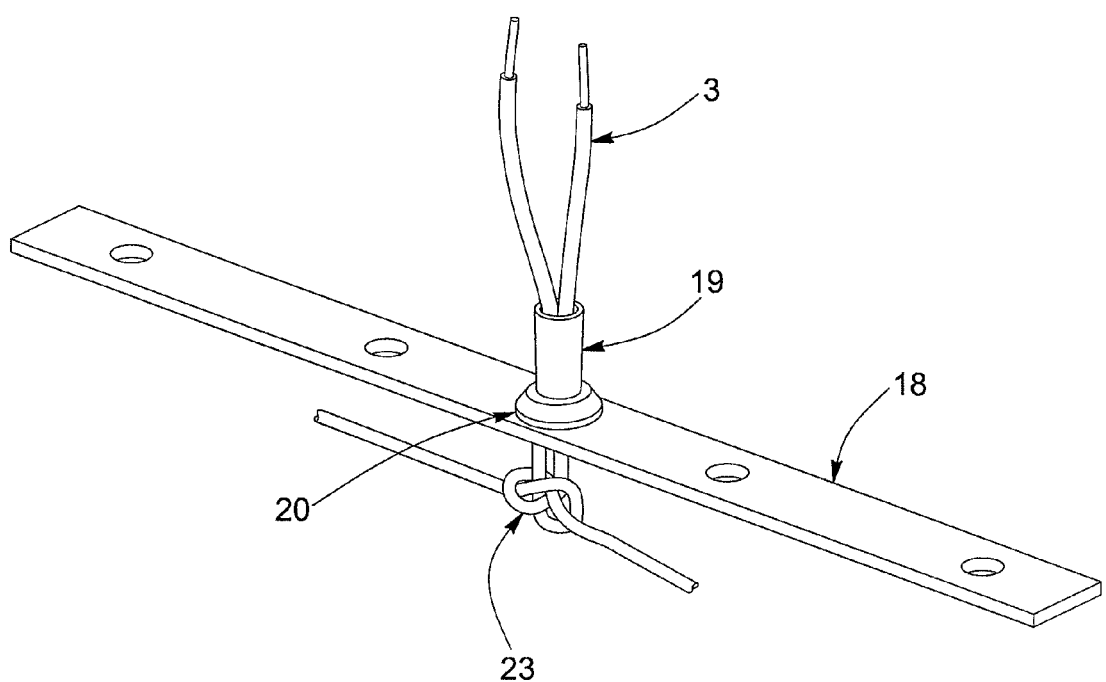
FIG. 6 show a pane provided with an attachment system according to a variation of the invention.

FIG. 6 shows a variation of the attachment system which would enable secure an electric cable to a pane without a protective sheath. In this case, a socket 19 is secured to a plate 18 through welding (or again the two pieces could be monolithic, or molded, etc.). A knot 23 is made between the conductors in order to prevent them from slipping through the socket 19 (i.e. the knot is larger in diameter than the internal diameter of the socket.

Figure 7A:
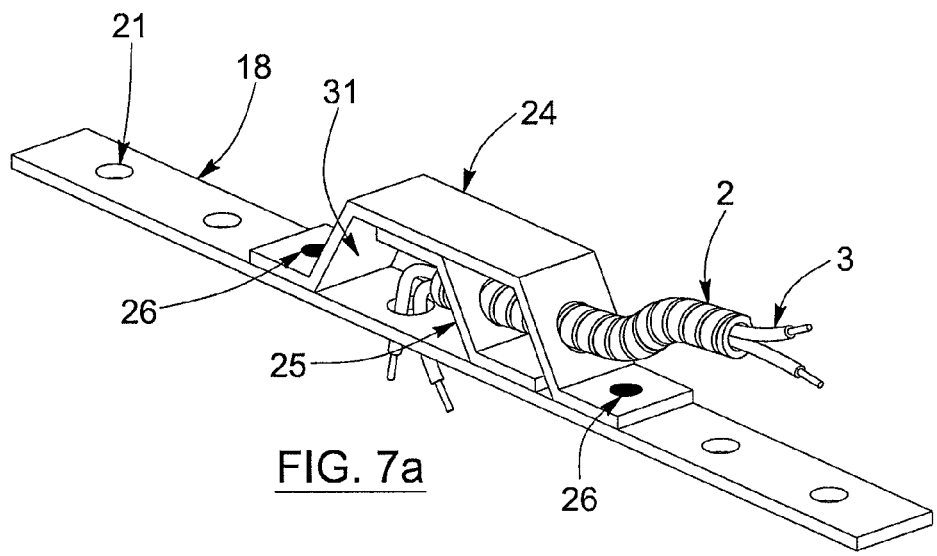
FIGS. 7a, 7b and 7c show a pane provided with an attachment system according to yet another variation of the invention.
Figure 7B:
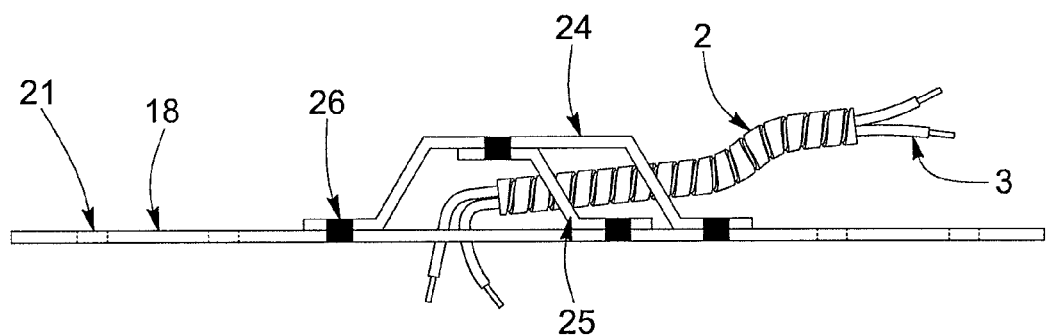
Figure 7C:
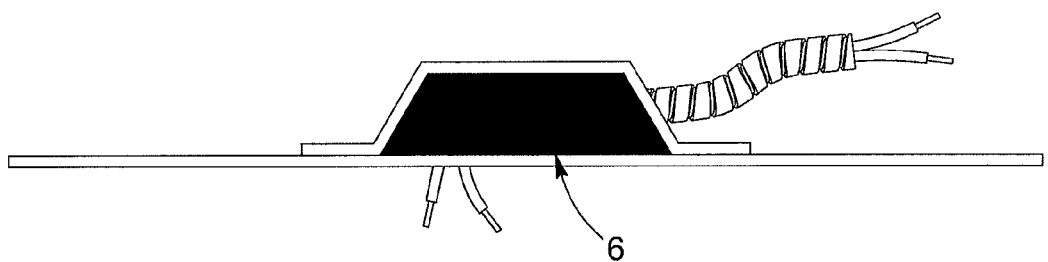

FIGS. 7a, 7b and 7c show yet another variation of the attachment system. In this case, the cable can be placed parallel to the plane, as opposed to perpendicular thereto as in the previous embodiments. Again, the plate 18 is provided, and a socket 24 is provided on one side of the plate 18 (preferably welded at weld points 26). The socket 24 is shaped and sized to form a space 31 between the socket 24 and the plate 18. A hole is provided on the socket 24 to permit the protective sheath 2 to be partially inserted into the space 31. The conductors pass through the plate, as in the previous embodiments, and the space 31 is filled with silicon, or any other sealant or adhesive. In a preferred embodiment, the protective sheath exits the socket 24 along a longitudinal axis of the plate 18, and parallel thereto.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. An attachment system for attaching an electric cable to a window pane, comprising: a window pane having top and bottom surfaces and four side edge surfaces extending between said top and bottom surfaces, a generally elongated plate, said plate having a width substantial equal to a thickness of said pane and a first surface and a second surface which is opposite to the first surface, said plate being provided with a plurality of holes, first surface of said plate being fastened to one of said four side edges;

a socket, said socket being fastened to the second surface of said plate, said socket being shaped and sized to receive a portion of an electric cable within it, said socket being in communication with an opening provided in said plate in order to permit said electric cable with electrical conductors to pass through said plate;

first fastening means for fastening said electric cable to said plate; and wherein said plate is fastened to said pane with second fastening means, said second fastening means being adapted to resist a 35 lb traction force.

2. An attachment system according to claim 1, wherein said socket is further provided with external threading, and wherein said electric cable further includes a protective sheath, said protective sheath being provided with internal threading matching said external thread of said socket, so that said first fastening means for fastening said electric cable to said plate consist of threading said protective sheath about said socket.

3. An attachment system according to claim 1, wherein said second fastening means include silicon.

4. An attachment system according to claim 1, wherein said plate is generally rectangular.

5. An attachment system according to claim 1, wherein said plate is generally U-shaped and being sized and shaped to receive one of said four side edges of said window pane within a space defined by said U-shape, said socket projecting perpendicularly from an opposite side thereof.

6. An attachment system according to claim 1, wherein said first fastening means for securing said electric cable to said plate include a knot made with electrical connectors of said electric cable, said knot being located on an opposite side of said plate from said socket, said knot having a diameter larger than an internal diameter of said socket.

7. An attachment system according to claim 1, wherein said socket is shaped and sized to define a space between said socket and said plate, said socket further being provided with a hole permitting entry of said electrical cable within said space, said space being filled with a sealant or an adhesive.

8. An attachment system according to claim 7, wherein said hole is positioned to permit said electric cable to exit from said space parallel to said plate, and along a longitudinal axis thereof.

9. In combination, an attachment system as defined in claim 1 and a window pane.

10. The combination of claim 9, wherein said window pane is a heated double pane, a laminated pane with liquid crystals, or a laminated pane with a film of particles in suspension.

* * * * *